United States Patent [19]

Cowan, II et al.

[11] Patent Number: 4,992,232

[45] Date of Patent: Feb. 12, 1991

[54] METHOD TO CONTROL N-16 RADIATION LEVELS IN STEAM PHASE BWRS

[75] Inventors: Robert L. Cowan, II, Livermore; Dragomir Duitna, Fremont; Robert J. Law, Livermore; Chien-Chang Lin; Carl P. Ruiz, both of Fremont; James L. Simpson, San Jose, all of Calif.

[73] Assignee: General Electric Company, New York, N.Y.

[21] Appl. No.: 380,790

[22] Filed: Jul. 17, 1989

Related U.S. Application Data

[63] Continuation of Ser. No. 91,556, Aug. 31, 1987, abandoned.

[51] Int. Cl.$^5$ .............................................. G21C 1/01
[52] U.S. Cl. ....................................................... 376/306
[58] Field of Search ................................ 376/305, 306

[56] References Cited

U.S. PATENT DOCUMENTS

| | | | |
|---|---|---|---|
| 3,294,644 | 12/1966 | Walton | 376/306 |
| 4,722,823 | 2/1988 | Honda et al. | 376/306 |

FOREIGN PATENT DOCUMENTS

| | | | |
|---|---|---|---|
| 149974 | 8/1981 | Fed. Rep. of Germany | 376/306 |
| 93996 | 5/1986 | Japan | 376/306 |
| 1095290 | 5/1986 | Japan | 376/306 |
| 2106398 | 5/1987 | Japan | 376/306 |

OTHER PUBLICATIONS

*Betz Handbook*, "Part 2. Corrosion Control", pp. 197–201.
LeSurf et al., "Ammonia Suppresses $O_2$ Production in BWR's", *Nuclear Tech.*, vol. 29, pp. 160–165, 5/1976.
Newell, "A Method for Decontaminating the Coolant Circ. of Water-Cooled Nuc. Reacs.", Cent. Elec. Gen. Board, Tech. Discl. Bulletin, No. 300, 12/1978.
Radiological Effect of Hydrogen Water Chemistry in the Environs of U.S. BWRs, (1986).
Radiological Effects of Hydrogen Water Chemistry, (1985).
Volatilization and Reaction of Fission Products in Flowing Steam, (PWR; BWR), (1985).
A Water Model in a Circulating Flow System with a Boiling Regions and its Application to Hydrogen Alternate, Water Chemistry of Boiling Water Reactors, (1985).

(List continued on next page.)

*Primary Examiner*—Charles T. Jordan
*Assistant Examiner*—Richard W. Wendtland
*Attorney, Agent, or Firm*—Townsend and Townsend

[57] ABSTRACT

In a boiling water reactor nuclear plant, hydrogen is injected into the feed water to neutralize radiolysis which causes stress corrosion in stainless steel components. It has been discovered that by inhibiting volatile ammonia, and other gaseous nitrogen compounds from leaving the liquid phase portions of the plant to the steam phase portions of the plant, radiation is reduced to acceptable levels. Formation of ammonia is inhibited chemically, by altering the reaction paths for volatile nitrogen species with trace additives in the parts per billion range, suitable additives include nitrous oxide, copper, zinc, carbon dioxide, and other components. It has also been found that by manipulating the pH, the formation of the voltage nitrogen compounds, especially ammonia, is decreased. Similarly, by physically altering plant operating conditions to reduce sparging or scrubbing of the gases from areas of high radiation, confinement of the N-16 within the liquid phase of the plant within the reactor vessel occurs. It is further found that by decreasing the total hydrogen concentration in the core region, the N-16 volatility can be limited. This includes alternate hydrogen injection points and enhancement of the hydrogen-oxygen recombination reaction by e.g., catalysis by radiation or by surfaces. The possibility of increasing the N-16 holdup time in the steam phase is also considered. Finally, the concept of operating at a higher electrochemical potential which requires a lower hydrogen concentration and hence less N-16 converted to the volatile form is also described.

19 Claims, 3 Drawing Sheets

OTHER PUBLICATIONS

Simulation Study on Water Radiolysis in BWR Primary Systems, (1983).

Numerical Techniques for Quantitative Evaluation of Chemical Reaction Systems with Volatile Species and Their Applications to Water Radiolysis in BWRs, (1985).

State of the Art and Some Problems of Nuclear Energy Development in Japan, (1984).

Dresden Unit Two: On-Line Decontamination and Alternate Water Chemistry, (1978).

Nuclear Power Plant Related Iodine Partition Coefficients, (1979).

Operation Process of Boiling Water Nuclear Power Plant—Includes Injecting Alkali to Keep Cooling Water at pH 7-8.5 and Controlling Dissolving of Corrosive Prod. Adhered to Fuel Rods, (1984).

Theoretical Model Analyses for Effects of Hydrogen Injection on Radiolysiss of Coolant Water in BWR, (1986).

Nuclear Power Plant, (1982).

Corrosion in Reactor Prim. Coolant System-By Injection of Hydrogen into Water Supplied to Prim. Cooling System, (1984).

Reducing Radioactive Contents of Boiling Water Reactor Condensate-By Adding Ammonia in Controlled Amts. between Condensate Desalter and Heater.

Abstract, "Chemical Behavior and Distribution of Volatile Radionuclides . . . Heater Drains"—Chien C. Lin, (Ref. A).

"Recent Developments in BWR Water Chemistry Control", R. L. Cowan et al., 2nd Int. Topical Meeting . . . Operations, Apr. 1986, Tokyo, Japan.

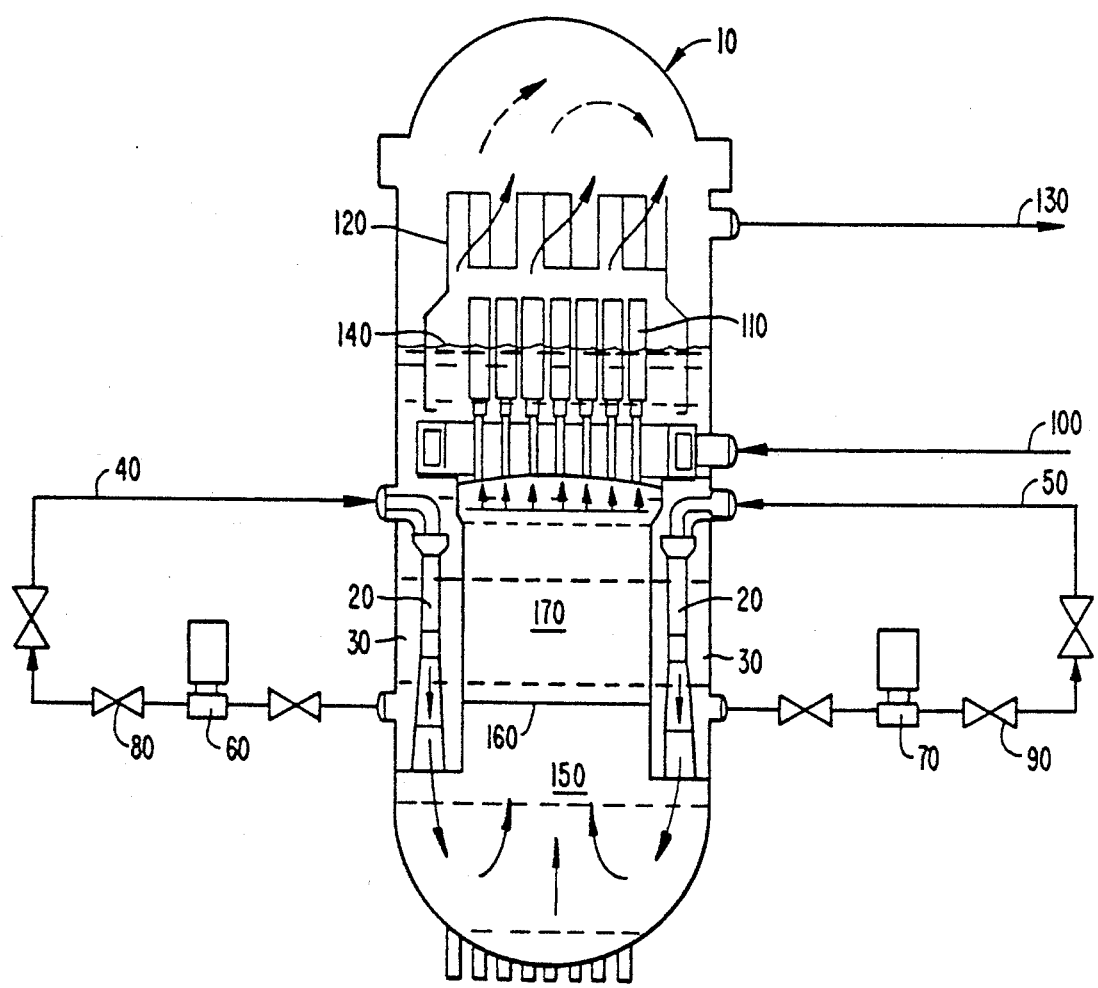
FIG._1.

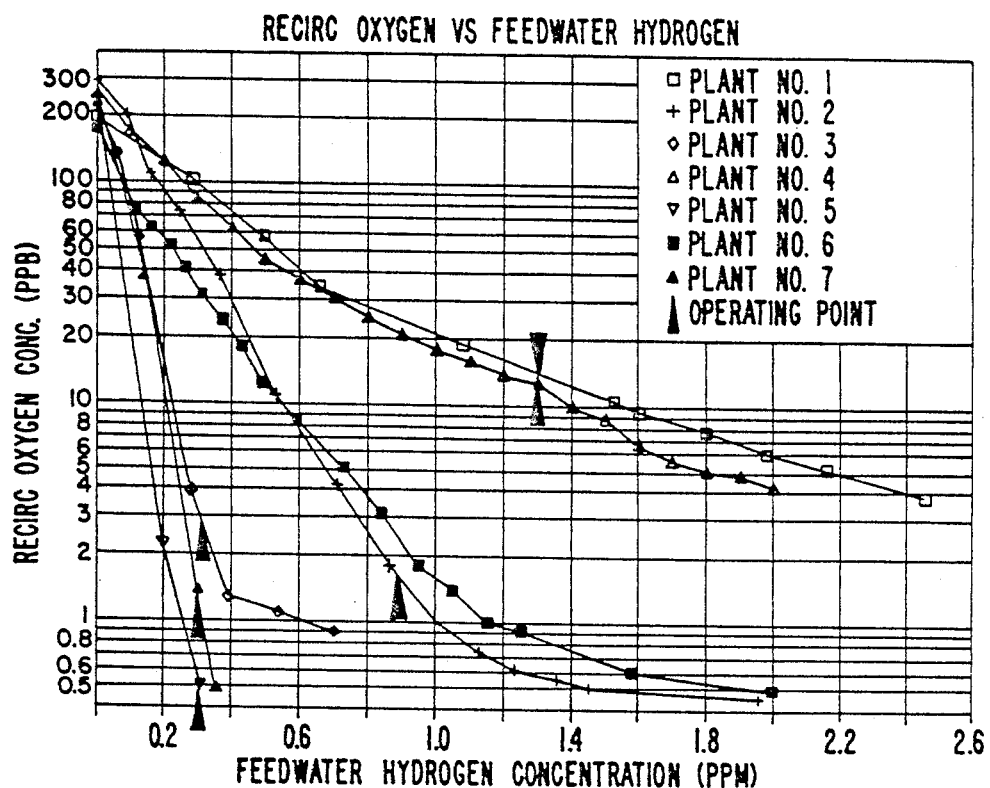
FIG._2.
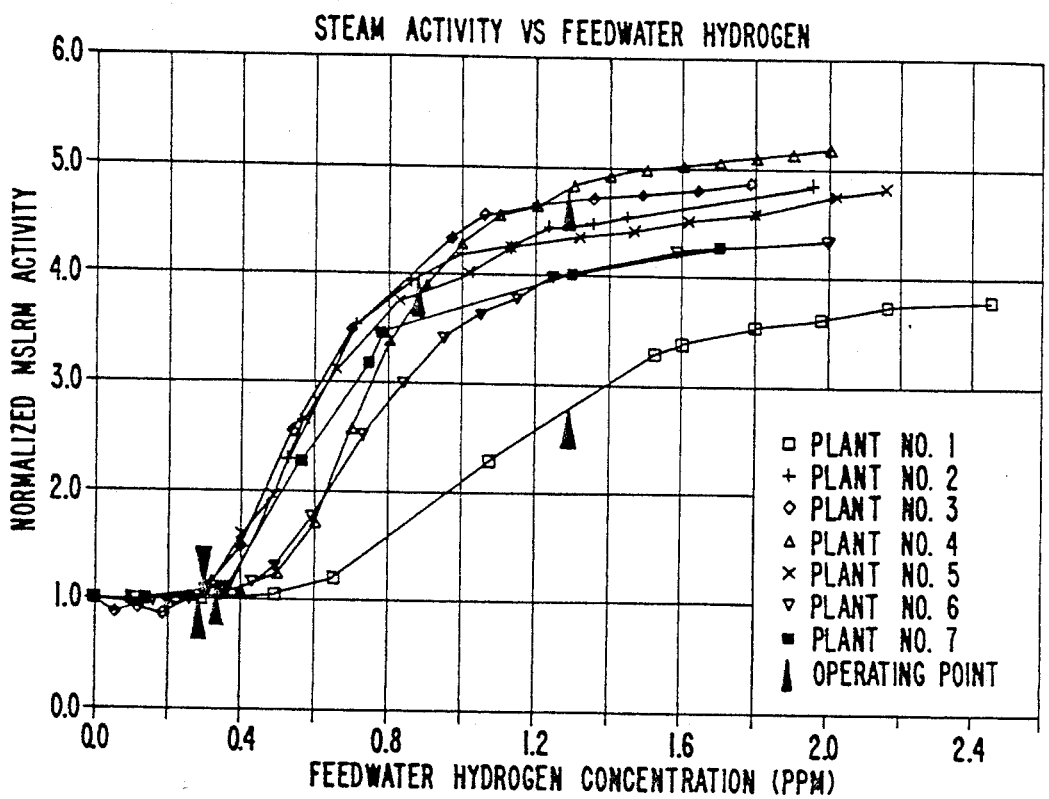
FIG._3.

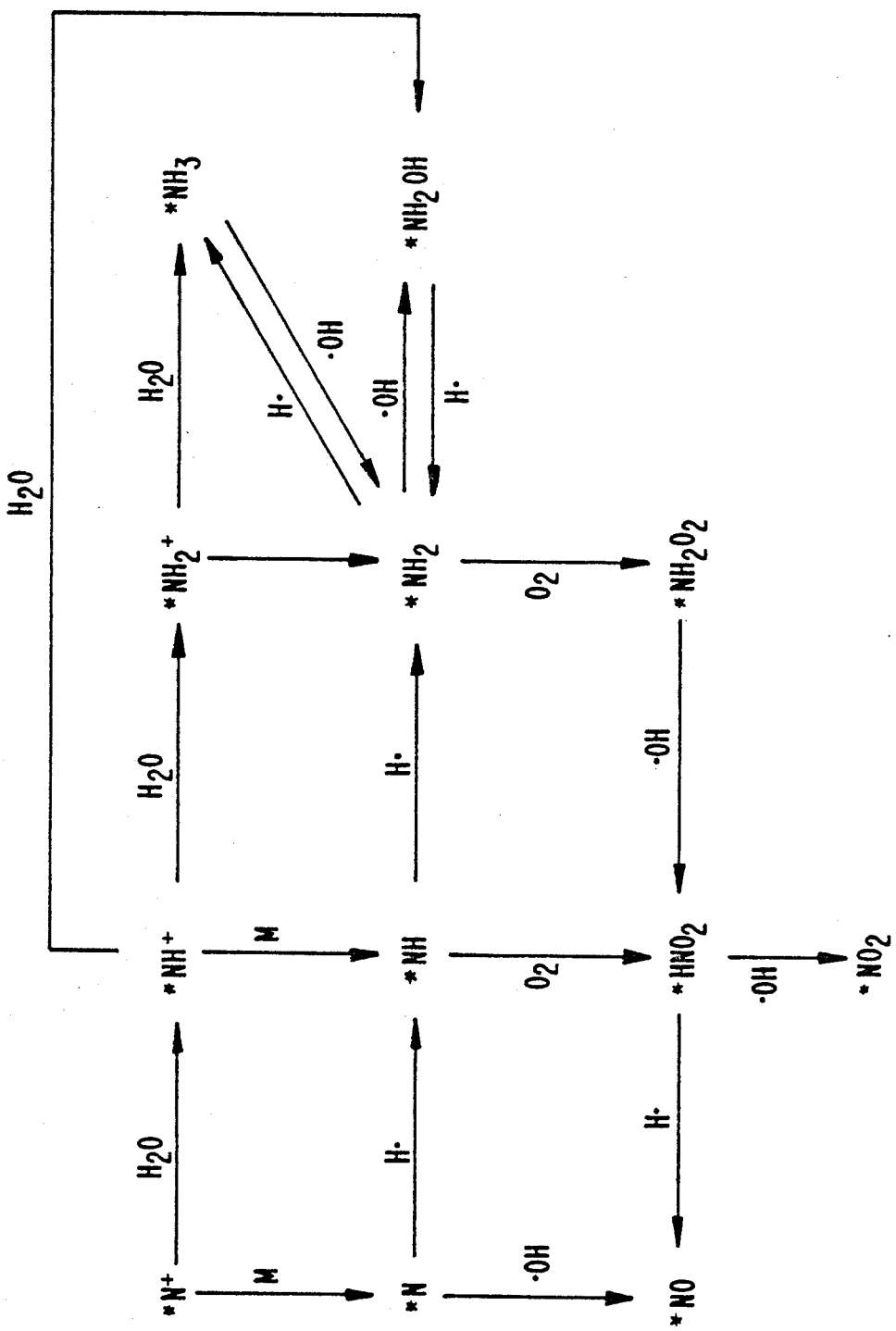
FIG._4.

METHOD TO CONTROL N-16 RADIATION LEVELS IN STEAM PHASE BWRS

This is a continuation of application Ser. No. 07/091,556, filed Aug. 5, 1987, now abandoned.

This invention relates to boiling water nuclear reactors (BWRs) operating under hydrogen water chemistry conditions. More particularly, a technique for restricting the levels of increase of radiation in the main steam lines due to N-16 production where hydrogen water chemistry is utilized to minimize intergranular stress corrosion cracking (IGSCC) is disclosed.

BACKGROUND OF THE INVENTION

Boiling water reactors (BWRs) operating over long periods of time have stainless steel components which are subject to IGSCC. The injection of hydrogen into the feedwater of BWRs has been demonstrated as an effective means of suppressing the stress corrosion cracking of these stainless steel components. Under normal water chemistry conditions, the oxygen concentration is approximately 200 parts per billion (ppb) and the hydrogen concentration is approximately 10 ppb. Under hydrogen water chemistry conditions, the concentrations necessary to prevent ISGCC are in the range of 2-15 ppb oxygen and 100 ppb hydrogen. These concentrations are approximate and vary among reactors.

To inspect for the presence of stress corrosion, non-destructive testing is used. Such non-destructive testing of piping joints requires plant shutdown while the inspection occurs. Thus, even the threat of IGSCC costs the plant expensive down time.

Unfortunately, and coincident with this hydrogen treatment, higher levels of radiation in the main steam lines and turbines have been observed. These higher levels of radiation in the more heavily shielded plants have not caused a significant problem. Heavily shielded turbines, condensers and steam piping have prevented the radiation from finding its way through to operating personnel and occupied areas. Unfortunately, many plants include heavy shielding in the turbine, condenser and steam piping side of the plant which is only adequate to limit dose rates under normal water chemistry. This being the case, the increased levels of radiation have tended to limit the use of hydrogen water chemistry to prevent stress corrosion.

BWR operation under normal water chemistry produces a small fraction of N-16 formed by the n,p reaction of 0-16 and exists in a chemical form which tends to be volatile. As this fraction is transported in the aqueous phase in the reactor and the water coolant is converted to steam, a portion of the volatile fraction is swept into the steam phase and transported to the turbine.

N-16 is a radioactive nuclide whose half-life is approximately 7 seconds. In its decay, high energy gamma radiation of 6 and 7 MeV is emitted. Thus, during normal plant operation a significant radiation field emanates from the steam lines and turbine. Because of the intensity and relatively high energy of the gamma radiation, significant shielding is required to limit the radiation field intensity. In spite of the shielding, the influence of the N-16 source can be measured even at significant distances from the source.

We have discovered as a part of the present invention that the observed radiation levels are caused at least in part by the N-16 being converted into volatile nitrogen compounds, including ammonia, which are transported in the steam phase.

Under hydrogen water chemistry conditions, a larger fraction of the N-16 is converted to a volatile form. Thus, the radiation levels in the steam phase increase significantly when compared to the levels without hydrogen addition. Dependent on the reactor, the levels have been measured by us to increase from 1.2 to 5 times at the hydrogen concentration necessary to prevent IGSCC in the recirculation system. For some plants the increase is sufficient to exceed safety dose rate limits not only close to the source, but also in surrounding buildings and grounds and at site boundaries. This is perceived as one of the most detrimental aspects of hydrogen water chemistry. Thus, it would be highly desirable if a method could be found to limit the N-16 volatility, i.e., the quantity transported to the steam.

SUMMARY OF THE INVENTION

The present invention generally provides a method for operating boiling water reactors with hydrogen water chemistry under conditions limiting the level of released radiation which has heretofore accompanied such chemistry. More specifically, by inhibiting the transfer of gaseous nitrogen compounds from the liquid phase to the steam phase, the release of radioactive N-16 into less shielded portions of the reactor system may be reduced. Various approaches for inhibiting such transfer are employed, depending in part on the operating mode of the reactor. Three operational modes are employed providing varying levels of hydrogen protection.

First, the boiling water reactors may be operated with full plant protection where feed water hydrogen concentration is sufficient to prevent IGSCC or irradiation assisted stress corrosion cracking (IASCC) in all parts of the primary reactor system, including all stainless steel components in both the recirculation system and in the reactor vessel. Second, the reactors may be operated with selective protection where hydrogen is introduced only at certain critical regions within the reactor, providing localized protection within those regions. Operating with selective protection allows less total hydrogen to be introduced, generating less N-16 than is generated with full protection. The critical regions for hydrogen introduction will generally include (a) the recirculation system, (b) the core bypass region, i.e., the region not contained within the boundary of the fuel assemblies and the region immediately above the fuel core, more particularly the region of the top fuel guide, and (c) the lower plenum region of the reactor vessel which includes the bottom of the vessel up to the region just above the fuel support plate. Third, the boiling water reactor may be operated with partial protection where the hydrogen concentration is lower than that required to attain the lowest electrochemical potential in order to completely inhibit IGSCC. Such mode of operation partially arrests crack growth and decreases the fraction of volatile N-16. In the first category, the approach is either to chemically decrease the quantity of volatile N-16 species transferred into the steam phase, to physically decrease the quantity of volatile N-16 species transferred into the steam phase, or to delay transport of the volatile N-16 species in the steam phase to the main steam line to the turbine for a sufficient time to allow substantial decay of the radiation.

The second and third categories involve the use of less hydrogen and hence less volatile N-16 formation.

FULL PROTECTION

First, formation of volatile nitrogen compounds may be chemically inhibited. This may be accomplished by altering reaction paths leading to the formation of volatile N-16 with small amounts of additives particularly free-radical scavengers and/or increasing the pH of the reactor feed water to an acidic level. Thus, the present invention provides for the introduction of trace quantities (ppb concentrations) of a species, to inhibit, suppress, or alter the reaction path of the radioactive nitrogen leading to the formation of a volatile species, e.g., ammonia, and/or enhancing the reaction path leading to a non-volatile species, e.g., a nitrite. Examples of possible additives are nitrous oxide, carbon dioxide, nitrite, nitrate, low molecular weight alcohols, or ketones, copper, zinc or vanadium, etc., not excluding other possibilities. Alternatively, a slight increase of the pH is effective to reduce the volatility of the ammonia. A change in pH may also alter the reaction paths leading to the formation of volatile nitrogen compounds. In this latter instance, the formation of volatile N-16 species is inhibited. Usually, the pH of the boiler feed water will be increased to the range from about 7.0 to 8.6 as measured at room temperature (normally, the feedwater will have a pH in the range from about 6.1 to 8.1). This may be accomplished by appropriate balancing of the anionic and cationic ion exchange resin used in the boiler water treatment facility.

Secondly, the N-16 transport to the steam phase can be limited by physical means. It is recognized that the N-16 is formed in two regions of the core: (1) within the envelope of the fuel bundle channel, i.e., the in-channel region, and (2) in the region outside the fuel bundle region, i.e., the bypass region. Essentially all the boiling occurs within the in-channel region and essentially none in the bypass region. In addition, the flow rate is much faster and hence the residence time in the in-channel region is much shorter than that in the bypass region, while the volumes of water in both regions are comparable. Thus, a significant portion of the N-16 formation occurs in the bypass region. Because the residence time of the water in the bypass region is significant compared with the half life of N-16, a decrease in the flow rate will decrease the total production of N-16 at the core exit, which constitutes one physical method of control.

A second physical method involves limiting the contact time between the steam and water. This will decrease the net transfer of the volatile N-16 species from the liquid to the steam phase and, hence, limit the N-16 steam phase concentration. This approach may be achieved by physically altering the region above the core.

A third method involves increasing the retention time of the N-16 in the steam by several seconds which is significant compared to the half-life. This may be accomplished by a physical means of providing an increased volume for the steam as close to the reactor vessel as possible. This volume could be shielded. An alternate method may involve a chemical method of adsorption onto a matrix material for a long enough time (seconds) to effect a significant delay relative to the second half-life.

SELECTIVE AND PARTIAL PROTECTION

The concentration of hydrogen required to achieve protection of the recirculation system stainless steel components varies significantly among plants. (See, FIG. 2). Such variation is attributed to differences in the effectiveness of hydrogen utilized to promote hydrogen-oxygen recombination in the downcomer region. Thus, methods which can promote the efficiency of hydrogen utilization will decrease the total hydrogen utilization and diminish the amount of volatile N-16 generated and transported into the steam phase. Reducing the hydrogen concentration required can be beneficial in reducing the N-16 steam phase activity depending on the ultimate hydrogen concentration required (see FIG. 3). This can be accomplished by methods such as catalyzing the hydrogen-oxygen recombination reaction, for example by increasing radiation in the downcomer region, or possibly by surface catalysis.

It is also recognized that hydrogen injected into the feed water, the usual region of injection, is only partially available to the downcomer region. That is, the hydrogen bearing water partitions at the top of the jet pump such that a portion goes into the jet pump and hence directly into the core, which bypasses the downcomer region. Therefore, if the hydrogen is injected below the inlet to the jet pumps, the total quantity is available for the downcomer region. Since this can result in a corresponding decrease in the total amount of hydrogen added (and going into the core region) less volatile N-16 will be formed.

To ensure an adequate concentration of hydrogen in the bypass region of the core while limiting the volatile N-16 production, hydrogen can be injected directly into bypass regions. Such hydrogen injection in combination with the techniques described for enhancing hydrogen utilization in the downcomer region, will reduce the overall hydrogen addition and hence reduce the volatile N-16 concentration. Under such operation, both the recirculation system and the core bypass region would be protected from IGSCC and IASCC with only relatively small increases in the volatile N-16 concentration.

In the lower plenum region, a sufficiently low oxygen concentration may be attained in this region by the addition of hydrogen e.g., via feedwater addition, and catalyzing the recombination reaction by either increased radiation in this region or in the vicinity of the jet pumps or by surface catalysis, as in the downcomer region described above.

For partial protection, it is possible to operate at a somewhat higher electrochemical potential so that the crack growth rate is reduced but not stopped. This would require less hydrogen and hence decreased formation of volatile forming of N-16.

Under either full or partial suppression, it also appears very likely that the fraction of ammonia (N-16) transferred to the steam phase can be affected by other changes in physical parameters. Among these, changes in the water level in a reactor core may be effective in reducing the N-16 level in the steam phase to compensate at least partially for the increase in radiation levels brought about by operation under hydrogen water chemistry. Other parameters include but are not limited to recirculation flow rate, axial power distribution, and axial steam void distribution.

BRIEF DESCRIPTION OF THE DRAWINGS

FIG. 1 is a schematic illustration of a boiling water reactor plant illustrating the primary components of a boiling water reactor.

FIG. 2 is a graph illustrating the differences in the oxygen concentration in the recirculation system among seven plants as a function of the hydrogen concentration.

FIG. 3 is a graph illustrating the effect of the injection of hydrogen on increased levels of N-16 radioactivity for a number of jet pump BWR plants.

FIG. 4 is the likely reaction sequence for the N-16 species in a BWR plant.

DETAILED DESCRIPTION OF THE INVENTION

The formation of N-16 occurs by reaction of an energetic neutron with O-16 in the water. The energetics of the reaction are sufficient to completely disrupt all chemical bonds and results in a nitrogen atom with a high positive charge immediately after formation with a significant kinetic energy (approximately 0.4 MeV). As the charged ion becomes thermalized, electrons are recaptured to approach a more neutral condition. In the process, chemical bonds of the surrounding medium (predominately water) and other species in dilute concentrations are also disrupted.

Near the end of the thermalization process, the nitrogen species and surrounding molecular fragments are highly reactive. The subsequent radiation chemistry reactions can be influenced by the behavior of the species present, e.g., the affinity of species for electrons, the tendency for free radical formation, their chemical reactivity, etc. It is during this period of intense chemical reactions that the end product chemical species are formed. For example, changing from normal water chemistry in reactor water with approximately 200 ppb oxygen and 10 ppb hydrogen to hydrogen water chemistry at 15 ppb oxygen or below, and approximately 100 ppb hydrogen results in the chemical change of the N-16 from the predominately non-volatile form as a nitrate or nitrite to a volatile form, such as ammonia.

Two general approaches are provided for suppressing the formation of volatile N-16 ammonia compounds resulting from the hydrogen water chemistry conditions. The methods may be utilized independently or in combination. Under full plant protection, the chemistry can be altered to suppress or inhibit the reaction path for the formation of the radioactive N-16 volatile species or to enhance the reaction path leading to the non-volatile species such as nitrite or nitrate. Alternately, physical parameters which include reactor vessel internals or plant operations can be manipulated within the bounds of normal operating conditions, to reduce the transfer of the radioactive volatile compounds to the steam phase. Under selective or partial protection, methods to enhance the hydrogen utilization for reducing the oxygen concentrations (and thereby prevent IGSCC in the recirculation system) can be utilized which involve either chemical or radiation chemical methods or physical methods. For protection of the core bypass region, the physical method of supplemental injection of hydrogen directly into the region may be utilized. For protection of the lower plenum region of the reactor vessel methods to enhance the hydrogen-oxygen recombination reaction by chemical or radiation chemical methods may be utilized. For operation at less than the electrochemical potential necessary to completely arrest crack growth, but only to retard crack growth (i.e., partial protection conditions), less hydrogen would be required. The primary objective of all of these methods is to reduce the overall hydrogen usage and hence the formation of volatile N-16.

Under normal water chemistry conditions, the oxygen concentration measured in the recirculation lines of a BWR is in the range of 180–300 ppb, with a corresponding electrochemical corrosion potential (ECP) of 0 to 0.1V, SHE. The sensitized (or creviced and/or severely cold worked) stainless steels and nickel based alloys of the reactor components are susceptible to IGSCC. The driving force for IGSCC can be eliminated if the ECP of the stainless steel is reduced below a critical value.

It is known that the addition of hydrogen to the feedwater of a BWR could result in the lowering of the concentration of oxidizing radiolysis products ($O_2$, $H_2O_2$, etc.), resulting in a reactor water chemistry with an ECP below the potential where IGSCC could occur. With the addition of hydrogen, the reactor water becomes less oxidizing and this chemical change affects the N-16 distribution in the coolant. N-16 is formed from an (n, p) reaction in the core with the O-16 of the coolant in the reactor core and decays with a half life of approximately 7 seconds. In its decay, high energy gamma radiation of approximately 6 and 7 MeV is emitted. Thus, during normal plant operation, a significant radiation field emanates from the steam lines and turbine.

Under normal conditions, the more oxidized chemical forms of N-16 are formed, e.g., nitrite and nitrate. Under the more reducing chemical conditions of HWC, the N-16 forms predominantly volatile chemical species, e.g., ammonia. Since the ammonia form is much more volatile than oxidized species, a switch to HWC conditions at a hydrogen concentration necessary to prevent IGSCC can result in a significant increase in the N-16 in the steam phase with an accompanying increase in the gamma radiation emitted along the main steam lines, and elsewhere on the steam side of the plant facilities.

The magnitude and impact of the radiation increase is different for each BWR plant because the reduction in the oxygen concentration and the corresponding IGSCC protection potential for the recirculation is achieved at differing rates of hydrogen injection. In addition with the different building and equipment layouts, the impact of the actual magnitude of the radiation increase inside and outside the plant can vary significantly. Because HWC offers such increased margin to IGSCC to both plant pressure boundary components and internals, many BWR plants could plan HWC implementation as part of their overall plans to increase plant availabilities and plant life. However, many BWRs do not have sufficient shielding in and around the plants to tolerate the increased radiation levels resulting from the increased volatile N-16 production. Thus, the reduction of volatile N-16 production would facilitate implementation of HWC in BWRs.

FIG. 1 is a hardware schematic illustrating the water flow paths through the reactor vessel 10. Jet pumps 20 draw in water from the top of the downcomer region 30 and combined with the drive flow water 40, 50 provide the coolant flow to the bottom of the reactor vessel. The water rises in the lower plenum region 150 up through the core support plate 160 and into the fuel region 170. The water not entering the jet pumps flows down the downcomer region 30 and provides the water for the recirculation loops. The recirculation pumps 60, 70 and flow control valves 80, 90 regulate the recirculation flow rate. The hydrogen gas is injected to the reactor vessel with the main feed water flow from water condensate from the turbine at 100. Steam produced by the fission heat passes through the steam separators 110, up beyond the steam dryers 120 and out of the vessel at 130 as main steam flow to drive the turbines of the plant.

Various of the physical parameters can be manipulated to reduce N-16 levels reaching the steam side of the plant.

The transfer of the volatile N-16 species to the steam phase occurs predominately in two regions of the reactor vessel: (a) within the core region where essentially all the boiling occurs within the fuel channel and (b) in the region above the core where the water from the bypass region merges with the water and steam from the in-channel region and in the lower portion of the steam separator region.

The present scheme for controlling N-16 in the steam phase involves two general approaches:

(a) under the concept of full oxygen suppression and hence protection in all parts of the primary system, which may require the higher concentration of hydrogen, the levels of N-16 in the steam phase can be significantly higher. In this case, two general methods are possible. One method is altering the reaction paths leading to the formation of volatile species of N-16 such that less of the volatile species is formed and hence less would be volatilized. The alternate to this is to reduce the volatile N-16 concentration that is present in the steam phase before it flows to the turbine.

(b) under the concept of selective oxygen suppression, i.e., oxygen suppression and hence protection in selected regions of the primary system or partial suppression where the crack growth rate is retarded but not fully suppressed, the objective is to minimize the total use of hydrogen and thereby to limit the amount of volatile N-16 which is formed (in the core region).

Each of these approaches with methods for implementation are described in the following paragraphs. Although each is described separately, it is envisioned that one or more may be used simultaneously to provide flexibility in application and to allow optimization for each plant.

FULL PROTECTION

Under this mode of operation, a sufficient hydrogen concentration is maintained in the feed water and throughout the whole primary system that the oxygen concentration is decreased to a level that corrosion such as IGSCC is arrested. This hydrogen concentration will probably be sufficiently high so as to cause a significant increase in the N-16 main steam line concentration with a corresponding increase in dose rate (FIG. 3). This is caused by the N-16 species produced by the n,p reaction on 0-16 undergoing a series of reactions with the surrounding medium and resulting in the formation of a volatile species such as ammonia, which is rapidly sparged from the water by the action of the steam in the boiling regions of the reactor. The N-16 concentration in the steam phase can be decreased by either decreasing the fraction of volatile N-16 formed, limiting the transfer of the volatile N-16 transfer to the steam phase, or delaying the volatile N-16 species in the steam phase prior to routing to the turbines.

The fraction of volatile N-16 formed may be decreased by the addition of chemical species, particularly free radical scavengers, so as to alter the reaction path leading to the formation of the volatile N-16 species formed from the radiation chemistry reaction of the "hot" N-16 atom formed from the n,p reaction and the subsequent reactions in the radiation field of the reactor core. The formation of volatile N-16 occurs through a series of reactions some of which undoubtedly involve free radicals. A plausible reaction sequence for the N-16 species in the reactor coolant is shown in FIG. 4.

If a scavenger is added for example to react with the free radicals, the reaction path leading to the formation of ammonia can be changed (inhibited) and formation of another product species enhanced. Such scavengers may include nitrous oxide, low molecular weight alcohols and ketones, carbon dioxide, nitrite or nitrate, or the addition of metal ions such as copper zinc, or vanadium, to mention several possible candidates, but not to exclude other possibilities. The scavenger concentration need not be high, usually being from about 5 to 100 ppb, more usually being from about 20 to 30 ppb.

Additionally, a slight change in pH of the reactor water may be effective in altering the reaction paths for the formation of the volatile species. Reactor water is normally at a pH in the range from about 6.1 to 8.1 when measured at 25° C. by adjusting the pH within the range from about 7.0 to 8.6 and usually between 6.5 and 8.0, the production of volatile N-16 is inhibited. The pH may be adjusted by altering the anion/cation ration in the ion exchange resin in the feed water treatment plant. An increase in the pH also appears to decrease the volatility of the ammonia.

The concept of limiting the transfer of the ammonia from the liquid to the steam phase may be accomplished by physical methods. These methods are given by way of example, and include but are not limited to the following.

(a) Since the transfer occurs in the in-channel region and in the region above the core and takes a finite time to occur, a decrease in the contact time between the steam and the liquid phase will decrease the fraction of volatile N-16 species transferred into the steam. This may be accomplished by several methods which include:

1. decreasing the volume and hence the contact time in the mixing plenum region above the core which includes the region between the top of core and the steam separators;
2. increasing the recirculation flow rate which will decrease the steam void content and decrease the contact time between the liquid and steam phases. This would also have the effect of the ammonia tending to remain in the liquid phase and be "carried under" in the return of the water to the downcomer region during which the 7-second N-16 would undergo significant decay.

(b) The water in the bypass region of the core provides a significant source for N-16 production. Since the residence time in this region is long compared with the half life, increasing the residence time still further will result in a decrease in the overall production rate.

Another method involves delaying the volatile N-16 species after they are transferred into the steam phase. Thus, the steam in the dome region of the reactor vessel could be made to pass through a medium which will preferentially delay the volatile species, e.g., by adsorption, for at least several seconds to allow decay of the N-16 prior to transport to the steam line and the turbine. The delay could also be provided by a physical means of passing the steam into an expanded volume prior to its transport to the turbine. For example, a volume of the approximate size of the dome region of the reactor vessel would provide a residence time of approximately one half life wherein the N-16 concentration would decrease two-fold.

Manipulation of the physical parameters to reduce the quantity of N-16 entering the steam phase such as described in the example given above is necessarily limited by the reactor physics and hydraulics of the reactor system. The boiling water system is very dynamic and is constrained by the demands of producing sufficient steam to provide power up to the rated capacity and to do this as safely as possible without any added risk.

SELECTIVE PROTECTION IN SPECIFIC REGIONS

This approach is based on operating at a lower overall hydrogen concentration in the primary system and, more particularly, the core region. Reference to FIG. 3 indicates that various plants show major differences in the oxygen concentration in the recirculation system at given feed water hydrogen concentrations. For example, at a feed water hydrogen concentration of 0.3 ppm the recirculating oxygen concentration is less than 1 ppb for plant 5, but for plant 4 is still relatively high at approximately 100 ppb. It is noted (FIG. 3) that at this hydrogen concentration, the main steam line activity for any of the plants has not risen appreciably. This difference of nearly two orders of magnitude can be explained on the basis of the rates at which the oxygen-hydrogen recombination reaction occurs in the downcomer region. For those plants where the oxygen concentration decreases faster as a function of hydrogen addition, the recombination is catalyzed. It has been found that this variability among plants correlates with the dose rate to which the water is subjected in its traverse in the downcomer region 30 in the vicinity of the core, i.e., the region outside the jet pumps. Those plants with a higher dose rate can be thought of as utilizing hydrogen more efficiently (for recombination) at least in the downcomer and recirculation region. Therefore, any method which can be utilized to improve the hydrogen utilization will result in the use of less hydrogen and result in a lower volatile N-16 formation. This is the premise upon which this portion of the patent is based.

Protection of the recirculation system may be achieved by two general approaches: catalysis of the recombination reaction or changing the point of hydrogen injection. As already described, catalysis of the recombination reaction may be accomplished with increased dose rate. Thus, one option is to increase the intensity of the radiation field and/or increase the energy deposition rate in the water in the downcomer region for those plants where a larger concentration of hydrogen is required, such as plant 4. Another option is to catalyze the recombination reaction by reaction on the surface of an added material. One such surface may be the stainless steel itself.

The hydrogen has been injected in the feedwater for both plant 4 and for other plants where tests (not included in FIG. 3) have been performed. The feedwater, after mixing with the water from the core discharge, partitions at the top of the jet pumps. Approximately ⅔ enters into the jet pumps and is pumped directly to the core, leaving the remaining ⅓ available for reaction with oxygen in the downcomer region. If the hydrogen injection point is moved to a location in the downcomer region below the jet pump intake, the effective concentration would be increased approximately threefold. Therefore, the overall concentration could be decreased by a similar factor. With reference to FIG. 3, a threefold reduction in the hydrogen concentration from the feedwater concentration presently required to provide adequate suppression, i.e., approximately 1.2 ppm with an approximate 4.6-fold increase in the main steam line radiation level relative to normal water chemistry to a 1.6 fold factor increase at the equivalent feedwater hydrogen concentration of 0.4 ppm.

The problem of IASCC of stainless steel components in the reactor core has been identified. A consideration of the location of these components indicates that they are located primarily in the bypass region of the core, the region where there is no boiling, as in the downcomer region. Based on the premise that an adequate dose rate can catalyze the recombination reaction to a sufficient extent, it is most probable that because of the higher dose rate in the bypass regions of the core relative to the downcomer region of any reactor together with the longer residence time for an even higher absorbed dose, the oxygen can be suppressed very efficiently in the presence of minimum concentrations of hydrogen. It is possible that the quantity of hydrogen added to the downcomer region may be sufficient to reduce the oxygen concentration to a sufficiently low level in the bypass region. If not, hydrogen could be added directly to the bypass water to a sufficient concentration and still be significantly less than the equivalent feedwater concentration where a large factor increase in the main steam line radiation level occurs. In this case, it is most probable that protection from SCC would be provided not only for components in the bypass region, but also for stainless steel components such as the top fuel guide which is positioned at the top of the bypass region, but below the region where mixing occurs with water from the in-channel region.

The other region where the possibility of IGSCC exists and where the suppression of oxygen can be localized is in the region below the core, i.e., the bottom plenum of the reactor vessel. In this case, the hydrogen addition possibly via the feedwater would be required to this region. Since dose rate has been identified as a critical factor affecting hydrogen-oxygen recombination (for transversal times from two to five seconds in the downcomer region), it is possible that those reactors with a sufficiently high dose rate for efficient recombination in the downcomer may also have efficient recombination within the transversal time of the water in the jet pump prior to discharge into the lower plenum. If not sufficient, the recombination reaction would require an increase in rate using one of the catalysis methods previously described, i.e., radiation on surface catalysis.

While the above provides a full and complete disclosure of the invention, the description and illustrations should not be construed as limiting the scope of the invention which is defined by the appended claims.

What is claimed is:

1. An improved method of utilizing hydrogen water chemistry in a boiling water reactor nuclear power plant, the plant including a reactor which boils water to produce a liquid phase and a steam phase, a turbine for extracting power from the steam phase, a condenser for condensing steam from which power has been extracted, and a feed water system returning the condensed steam as boiler feed water to the reactor, wherein the process of injecting hydrogen into the boiler feed water is utilized to reduce stress corrosion, the improvement comprising the step of reducing the transfer of radioactive gaseous nitrogen compounds from the liquid phase to the steam by inhibiting the formation of said nitrogen compounds in the liquid phase.

2. The process of claim 1, wherein said inhibiting step comprises chemically inhibiting the formation of volatile N-16 species in the liquid phase.

3. The process of claim 2, wherein said inhibiting step includes adding at least one free-radical scavenger to the boiler feedwater, whereby the evolution of gaseous nitrogen compounds is inhibited.

4. The method of claim 3, wherein said scavenger is selected from the group consisting of nitrous oxide, copper, zinc, low molecular weight alcohols and ketones, carbon dioxide, nitrite and nitrate.

5. The process of claim 1, wherein said inhibiting step comprises adjusting the pH of said water to a basic level in the range from about 7 to 8.6, whereby the evolution of volatile nitrogen compounds is inhibited.

6. The process of claim 1, wherein said inhibiting step comprises the use of reduced sparging in a core of said reactor.

7. The process of claim 1, wherein said inhibiting step comprises increasing the recirculation rate of water flow.

8. The process of claim 1, wherein said inhibiting step comprises adjusting a control rod pattern.

9. The process of claim 1, wherein said inhibiting step comprises raising the reactor water level.

10. The process of claim 1, wherein said inhibiting step comprises injecting said hydrogen into a preselected region in the recirculation system, said region having been selected to allow for reduced hydrogen utilization, whereby less radioactive volatile nitrogen is evolved.

11. The process of claim 10, wherein hydrogen is injected into a region below a jet pump inlet in the recirculation system.

12. The process of claim 11, wherein hydrogen is injected into a bypass region in a core inlet.

13. The process of claim 1, wherein the transfer of radioactive volatile nitrogen compounds is inhibited by use of a selective adsorbent to increase the hold-up time of the nitrogen compounds to allow for further decay.

14. The process of claim 1, wherein the transfer of radioactive volatile nitrogen compounds is inhibited by increasing the hold-up time in steam lines from the reactor.

15. The process of claim 1, wherein the transfer of radioactive volatile nitrogen compounds is inhibited by the use of surface catalysis to improve hydrogen utilization, whereby the evolution of gaseous nitrogen is decreased.

16. The process of claim 1, wherein the transfer of radioactive volatile nitrogen compounds is inhibited by the use of increased radiation to enhance hydrogen-oxygen recombination.

17. The process of claim 1, wherein the transfer of radioactive volatile nitrogen compounds is inhibited by operating at a more positive electropotential allowing less hydrogen addition.

18. An improved method of utilizing hydrogen water chemistry in a boiling water reactor nuclear power plant, the plant including a reactor which boils water to produce a liquid phase and a steam phase, the improvement comprising the step of adding a free-radical scavenger to the liquid phase to inhibit the transfer of gaseous nitrogen compounds from the liquid phase to the steam phase.

19. The method of claim 18, wherein said scavenger is selected from the group consisting of nitrous oxide, copper, zinc, low molecular weight alcohols and ketones, carbon dioxide, nitrite and nitrate.

* * * * *

UNITED STATES PATENT AND TRADEMARK OFFICE
CERTIFICATE OF CORRECTION

PATENT NO. : 4,992,232

DATED : February 12, 1991

INVENTOR(S) : Robert L. Cowan, et. al.

It is certified that error appears in the above-identified patent and that said Letters Patent is hereby corrected as shown below:

On the Title page, item [75] second inventor should read-- Dragomir Dutina --.

Signed and Sealed this

Twenty-third Day of February, 1993

Attest:

STEPHEN G. KUNIN

*Attesting Officer*     *Acting Commissioner of Patents and Trademarks*